US007661662B2

(12) United States Patent
Forstmanis

(10) Patent No.: US 7,661,662 B2
(45) Date of Patent: Feb. 16, 2010

(54) WASTEWATER EVAPORATION SYSTEM

(76) Inventor: Talivaldis Forstmanis, 629 Mill Park Dr., Kitchener, Ontario (CA) N2P 1V4

( * ) Notice: Subject to any disclaimer, the term of this patent is extended or adjusted under 35 U.S.C. 154(b) by 614 days.

(21) Appl. No.: 11/356,968

(22) Filed: Feb. 21, 2006

(65) Prior Publication Data

US 2006/0197238 A1 Sep. 7, 2006

(30) Foreign Application Priority Data

Feb. 21, 2005 (GB) ................................ 0503533.2

(51) Int. Cl.
*B01F 3/04* (2006.01)

(52) U.S. Cl. ...................... 261/141; 261/78.2; 261/115; 261/157; 96/358

(58) Field of Classification Search ................ 261/78.2, 261/79.2, 115, 141, 152, 157; 96/356, 358, 96/360

See application file for complete search history.

(56) References Cited

U.S. PATENT DOCUMENTS 899,289 A * 9/1908 Braemer ................... 236/44 R
1,101,902 A * 6/1914 Braemer ..................... 261/128
2,110,203 A * 3/1938 Crawford ....................... 95/10
2,144,693 A * 1/1939 Seid ......................... 236/44 C
2,256,374 A * 9/1941 Cummings, Jr. ............. 95/216
2,805,047 A * 9/1957 Lofgren ....................... 165/47
3,167,413 A * 1/1965 Kiekens et al. ................ 96/232
3,423,173 A 1/1969 McFarlin et al.
3,582,051 A * 6/1971 Klein et al. ................ 261/79.2
3,664,094 A * 5/1972 Barkovitz et al. ............. 96/277
4,159,196 A * 6/1979 Schneider et al. ............. 96/358
4,968,336 A * 11/1990 Reimanis et al. .............. 96/246
5,425,902 A * 6/1995 Miller et al. ................ 261/128
6,293,121 B1 * 9/2001 Labrador ..................... 62/304

* cited by examiner

*Primary Examiner*—Scott Bushey
(74) *Attorney, Agent, or Firm*—Anthony Asquith Cor

(57) ABSTRACT

The water evaporation apparatus functions to increase the concentration strength of a contaminant solution in wastewater, for more economical disposal. A blower conveys an air stream along an air-conduit, over a nozzle or atomizer. The atomizer converts the incoming dilutely-contaminated water into fine droplets, and injects and distributes the droplets into the airstream. An air-heater is located upstream of the atomizer, and heats the airstream to a temperature of 110° C. at the atomizer. A droplet-collector receives the airstream, and the droplets, and mechanically extracts the liquid droplets from the airstream. The airstream leaves the droplet-collector at 65° C. in a saturated condition. The droplets coalesce, and become the final-water, comprising the strongly concentrated contaminant solution. An exhaust-conduit conveys air that has passed through the droplet-collector to the air-outlet. A heat-exchanger transfers heat from the exhaust airstream into the intake airstream, to supplement the air-heater.

4 Claims, 4 Drawing Sheets

40
32
34
36
35
37
38
39

COMPRESSED AIR IN
40
34
LIQUID IN
SPRAY OUT
39

54
60
52
53
59
58
50

57
56
52

WASTEWATER EVAPORATION SYSTEM

The invention is concerned with industrial wastewater of the kind that contains contaminants (e.g dissolved chemical salts) at dilute concentrations. The cost of disposing of large volumes of dilutely-contaminated water is very high. So, for reasons of economy of disposal, it can be efficient to evaporate some of the water away. Evaporation increases the concentration of the contaminant in the water, whereby the volume of contaminated water to be disposed of is much reduced. Even including the cost of the heat energy to create the evaporation, the reduced cost of disposing of the smaller volume of water can provide a large overall saving.

Traditional evaporators have heated the contaminated water conventionally, i.e by directing the wastewater over a heating element. This manner of heating works because the surface of the element is very much hotter than the water. If the element were only a few degrees hotter than the water, the element would need to be of an uneconomically large surface area in order to transfer a worthwhile amount of heat. The greater the temperature difference, the smaller the required surface area.

However, the presence of the high temperatures, in the conventional systems, can lead to problems such as scaling, fouling, corrosion, and other damage, and even fires. Also, the water has to be vigorously stirred or otherwise agitated, to make sure the whole body of water is heated evenly. Also, it can be difficult to evaporate the water on a continuous basis, whereby conventional evaporation operations have usually been done on a batch basis.

The high temperatures required in conventional evaporators means that only high grade energy can be used. Factories that produce contaminated wastewater in large quantities often also produce a good deal of low grade heat (i.e heat at only a few degrees above ambient), and this low grade heat is usually wasted for want of an apparatus or process that can usefully utilise low grade heat.

In the system as described herein, one aim is to ease the compromises inherent in the conventional evaporation process by evaporating the wastewater using heat at much lower temperatures. An airstream is heated to a temperature of, say, 110° C., and then passes over a nozzle, or atomizer, located in the conduit in which the heated airstream is conveyed. The contaminated water is blown out through the atomizer into the heated airstream.

The atomizer serves to break the contaminated water up into very small droplets. The smaller the droplets, the greater the surface area per gram of liquid water, and the more rapidly heat transfer can take place through that surface area and into the body of water within the droplet. Thus, breaking the wastewater into small droplets means that heat transfer and evaporation take place very rapidly. Also, the fine droplets that contain the un-evaporated wastewater reach equilibrium temperature very rapidly with respect to the hot airstream.

Raising the temperature of the water and evaporating the water cause the temperature of the airstream to fall. As will be explained, the airstream preferably should be hot enough, upstream of the atomizer, that, when the fine droplets of water have been more or less completely assimilated and distributed into the airstream, a little downstream of the atomizer, the airstream is then at a temperature of about 70° C. Typically, as mentioned, an airstream temperature of 110° C. upstream of the atomizer is sufficient to do this.

In the described system, the heated airstream, saturated with gaseous (vaporous) water, and containing a mist of droplets of liquid water, is now sent to a droplet-collector. Here, the droplets of liquid water are (physically) extracted from the airstream, such that the airstream emerging from the droplet-collector is saturated with gaseous or vaporous water but contains (ideally) no liquid droplets.

In the droplet-collector, the liquid droplets coalesce, and are collected in a collector-drain. The water in the collector-drain contains all the contaminant, but only a fraction of the water that was contained in the incoming wastewater. This strongly-concentrated solution is the final-water that is produced by the system, and the final-water is conveyed out of the apparatus, for disposal or further treatment (or re-use).

The airstream that emerges from the droplet-collector is saturated with gaseous or vaporous water, but—if the droplet-collector has been designed properly—contains no liquid water. In passing through the droplet-collector, the airstream sheds a little more temperature, whereby, in the system as described, the saturated airstream as it leaves the droplet-collector has a temperature, T-post-collector, of about 65° C.

The airstream may now be discharged as it stands, or may be passed through a heat exchanger, to recover some of the remaining heat.

The new system is advantageous when the contaminants are soluble. An aim of the system is to procure only so much evaporation as will strengthen the solution: the aim is not to procure too much evaporation of the wastewater, whereby the contaminants start to come out of solution as solid material. If that happened, such materials would precipitate onto the components of the apparatus, whereas when the contaminants remain in solution, they are carried away, still dissolved, in the final-water. An aim of the system is to control the evaporation to the extent that only as much water remains as is necessary to ensure that the contaminant remains dissolved—with a suitable margin of tolerance.

Thus, the rate and degree of evaporation should be closely controlled, and it is recognised as an advantage of the system as described that the rate of evaporation can be controlled accurately and precisely (as compared with conventional evaporators) very simply, by measuring and controlling the temperature T-post-collector to 65° C. or to another appropriate chosen value.

The new system is not so advantageous if the contaminants are volatile, i.e if the contaminants evaporate along with the water. The temperature T-post-collector should be chosen to be low enough that none of the contaminants in the wastewater tend to be volatile at the chosen temperature. By the same token, the lower the chosen temperature T-post-collector, the more the system can be used with contaminant liquids that tend to become volatile at temperatures above say 70° C.

An exemplary evaporator will now be described, with reference to the accompanying drawings, in which.

The apparatus described herein is exemplary. The scope of the patent protection sought is determined by the accompanying claims, and not necessarily by the specific features of an exemplary apparatus.

Figure 1:
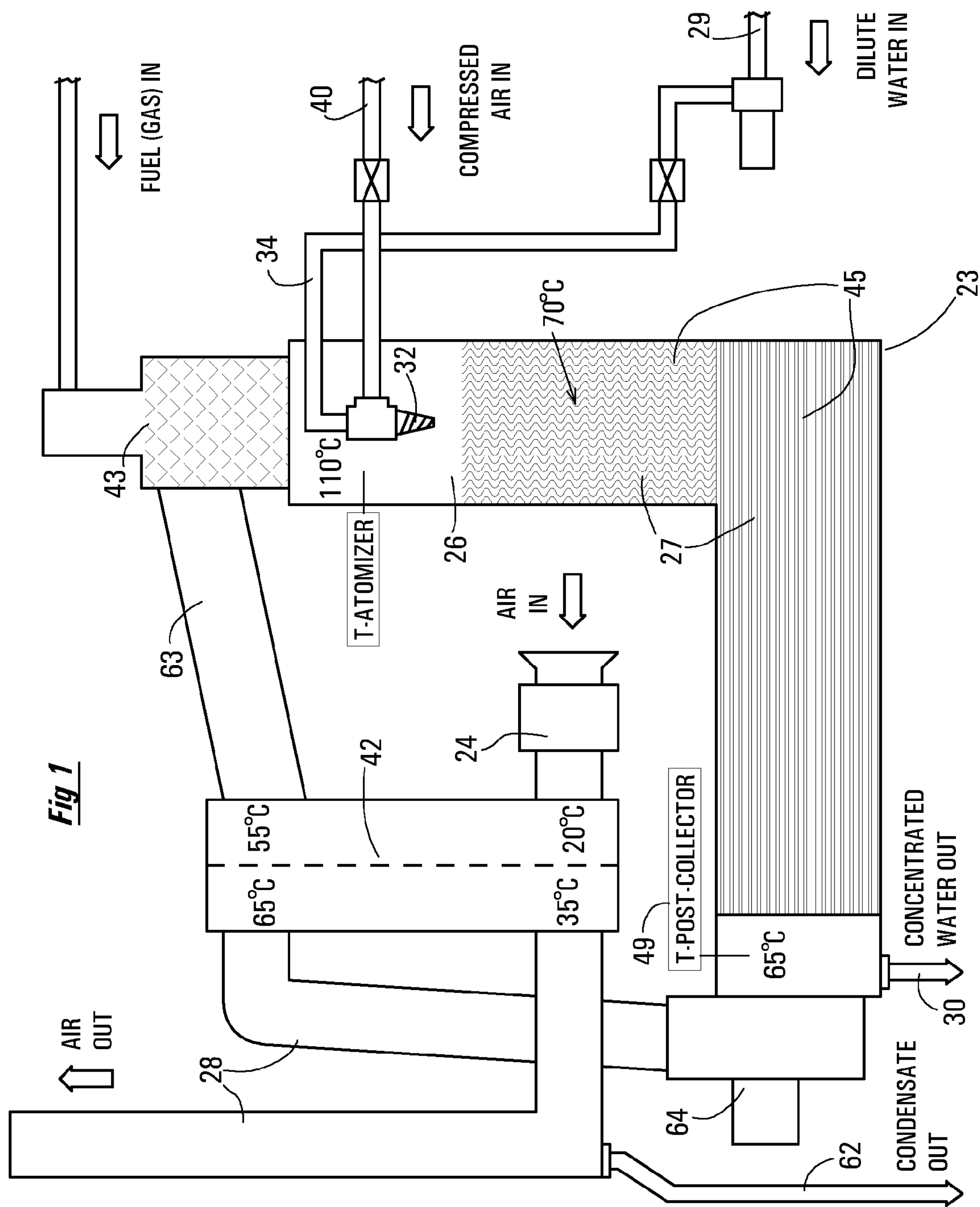
FIG. 1 is a diagrammatic view showing the arrangement of the components of an evaporator apparatus.
Figure 2:
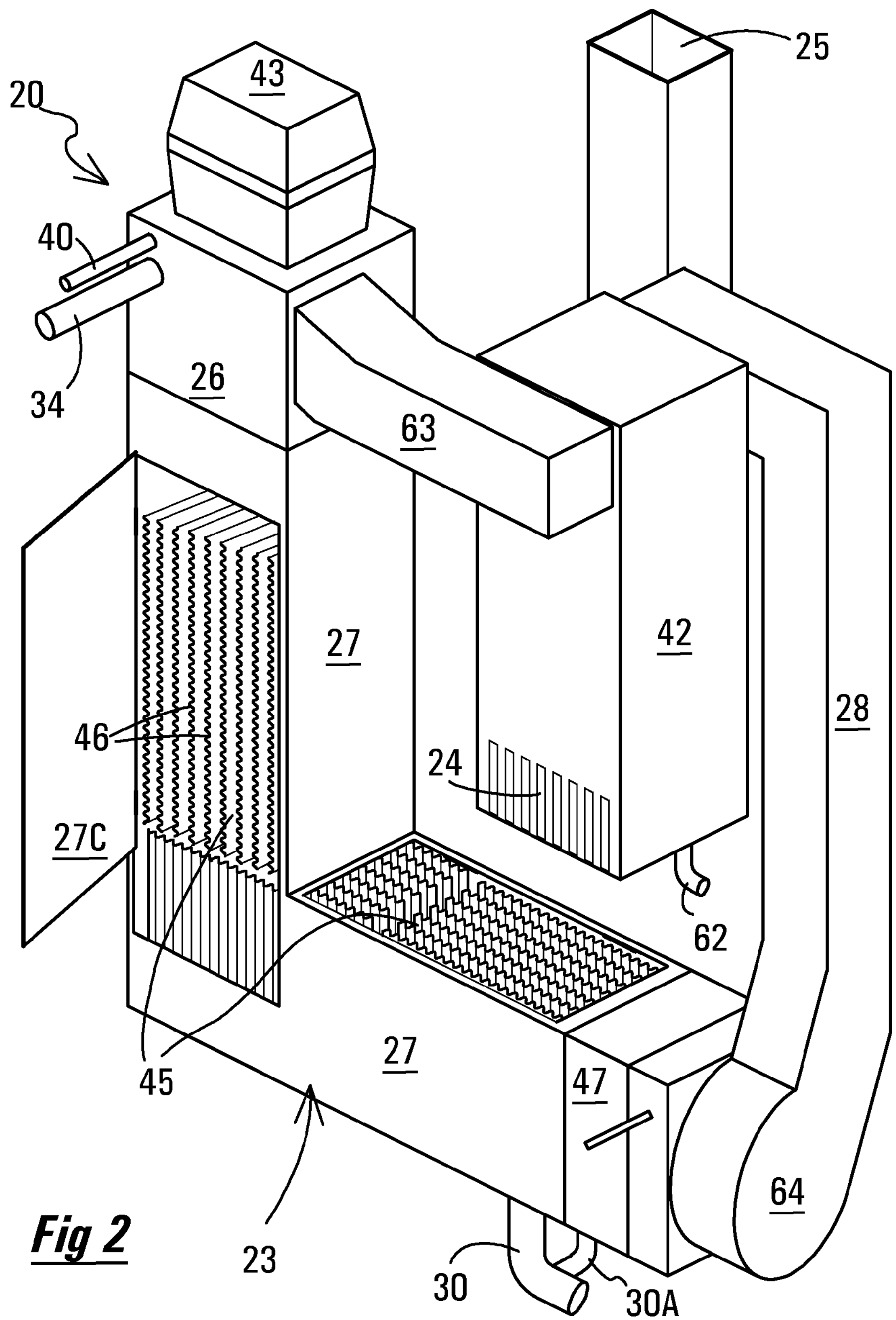
FIG. 2 shows the same apparatus pictorially, as a structure.

FIGS. 1,2 are diagrams showing the arrangement of the evaporator apparatus 20. The apparatus 20 includes an air-conduit 23, through which air is conveyed from an air-inlet 24 to an air-outlet 25. The air-conduit 23 includes a atomizer-conduit 26, a collector-conduit 27, and an exhaust-conduit 28.

Incoming water to be evaporated is introduced to the apparatus at water-inlet 29. The incoming water contains a dissolved chemical, for example a chemical salt contaminant, at a relatively weak or dilute concentration. After evaporation of some of the water in the apparatus, the remaining water is discharged from a final-water-outlet 30, now with the dissolved contaminant at a stronger concentration.

The incoming-water passes from the water-inlet 29 to an atomizer 32. The nozzle or atomizer used in the apparatus should be selected on the basis of the nature of the incoming wastewater. Often, in industrial situations, the wastewater will contain not only the dissolved contaminant, but also will contain solid dirt particles, non-aqueous liquids, and other debris that will plug up a fine orifice. The atomizer 32 should be selected as of the type that is suitable for atomizing water into very fine droplets, but which does so without resorting to tiny orifices and passages the atomizer should have large liquid passageways which will not become clogged.

Figure 4:
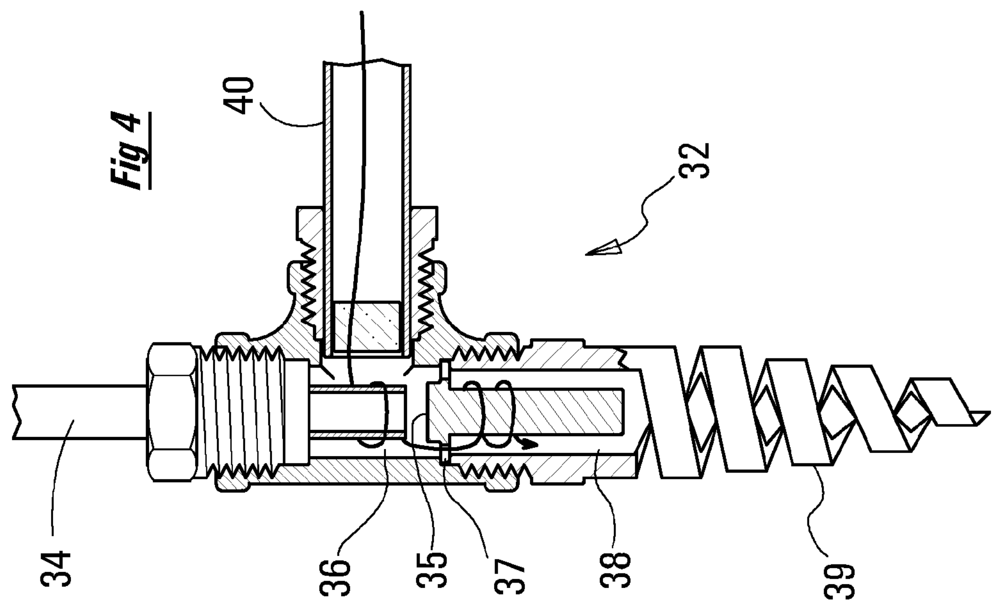
FIG. 4 is a cross-section of the atomizer.
Figure 3:
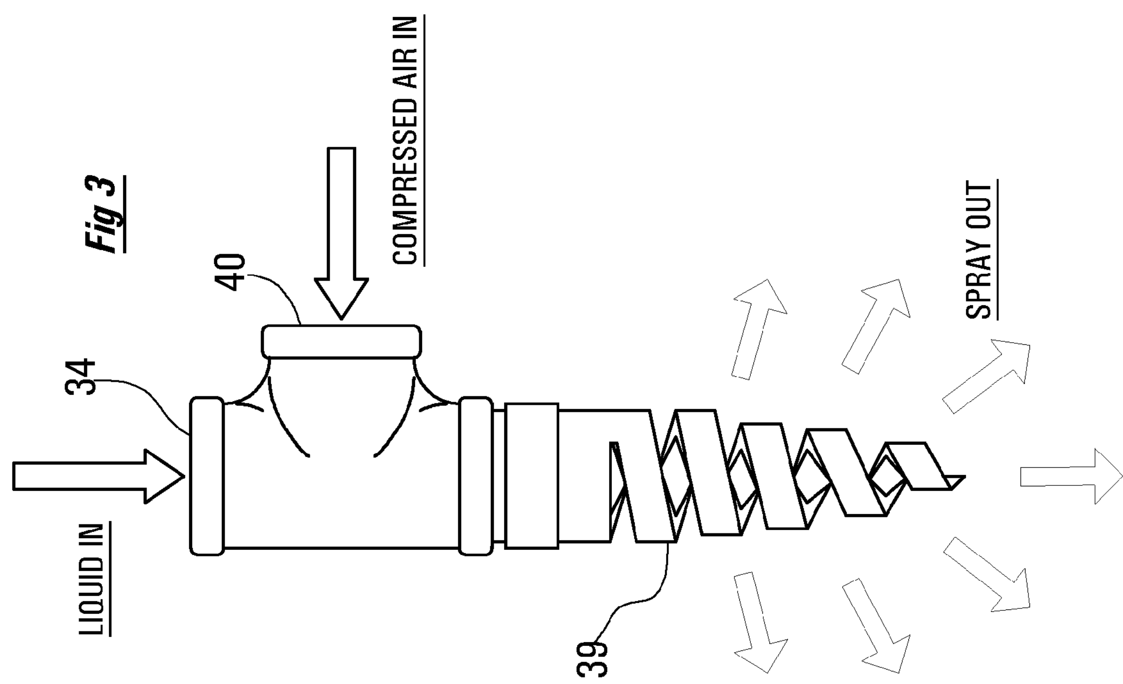
FIG. 3 is a pictorial view of an atomizer that is a component of the apparatus.

The structure of a suitable atomizer 32 is shown in FIGS. 3,4. The atomizer 32 receives the incoming-water at an atomizer-water-inlet 34. The water impinges on an impact-plate 35, as a result of which the liquid body breaks up into droplets, in the impact chamber 36. The water droplets then pass out through spokes 37 of the impact-plate, through an annular tube-area 38, and into the spiral distributor 39.

Air under pressure is applied to an atomizer-air-inlet 40. The compressed air enters the impact-chamber 36 off-centre, or tangentially, whereby air and water are forced to rotate in the impact-chamber 36, at high speed. The mixture of air and water droplets impinges upon the spiral distributor 39, which hurls the mixture aside. The water is atomized into fine droplets by the violent mechanical disruption of the liquid, and by the high speed rotation of the liquid, in passing through the atomizer. The compressed air used for atomization may be pre-heated, if a suitable (low-grade) source of heat is available.

The incoming airstream enters the apparatus through the air-inlet 24. The air passes first through a heat-exchanger 42, where, in a typical case, the incoming airstream is pre-heated to 55° C. or 60° C. The pre-heated airstream then is further heated, in this example by the use of a gas burner 43, which supplies enough energy to the airstream that the airstream has a temperature as it passes over the atomizer 32 (being temperature T-atomizer) of, typically, 110° C.

Thus, the atomizer 32 injects the incoming contaminated wastewater (and the compressed air) into the heated airstream in the atomizer-conduit section 26 of the air-conduit 23.

As the atomized water droplets come into contact with the heated airstream, the conditions are such that some of the water content of the droplet evaporates into the airstream and becomes gaseous, while the rest of the droplet (and all the dissolved contaminant) remains in liquid form, i.e as a mist, in the airstream. In a properly designed system, the airstream is now saturated with water vapour, as appropriate to its particular temperature, and the airstream contains also a mist of non-evaporated liquid water.

The system as described only serves to increase the strength of the contaminant solution if the contaminant is not volatile at the temperatures involved. Thus, in a properly designed system, the evaporated water that passes into the airstream in gaseous (vaporous) form contains none (or almost none) of the contaminant; that is to say, all (or almost all) the chemical contaminant is retained, still in solution, within the droplets of liquid water.

The saturated airstream now passes to the droplet-collector 45, which is located in the collector-conduit portion 27 of the air-conduit 23, located downstream of the atomizer 32. The function of the droplet-collector 45 is to physically extract the droplets of liquid water from the airstream. The droplet-collector does this by directing the airstream to impinge against the surfaces of a series of collector-plates 46, whereby the individual droplets are caused to coalesce. The coalesced droplets form a body of liquid water, which trickles down the collector-plates 46, and drips into a collector-drain underneath the collector-plates 46. The collected water is then conveyed away, out of the apparatus, via the final-water-outlet 30.

The collector-plates 46 are of corrugated profile, as shown in FIG. 2. The airstream impinges against the corrugations obliquely, whereby the individual droplets come together gently; the designer should aim for the droplets, once they have contacted the surface of the collector-plate, to remain in contact with the collector-plate 46, and not to bounce clear, which would cause the droplets to break up again.

The designer arranges the collector-plates 46, as to their size and juxtaposition, with the intent that every physical droplet of liquid water contained in the airstream is removed therefrom, whereby only water that has actually evaporated, and is in gaseous from, remains in the airstream, as the airstream emerges from the collector-conduit portion 27 of the air-conduit 23.

The collector-plates occupy both the down-portion 27D and the bottom portion 27B of the collector-conduit 27. The two portions of the conduit have covers 27C, for inspection, cleaning, servicing etc. The plates 46 can be lifted out and removed/replaced individually if necessary. The corrugated sheet metal plates can be cleaned in-situ by pressure washers or other spray devices. The covers 27C can be designed to open easily, to provide blow-out protection in situations where high concentrations of volatile organic compounds are expected.

The droplet-collector 45 includes also a demister 47. The function of the demister 47 is to remove even the finest of droplets of liquid water from the airstream. The demister may be regarded as a fine filter. It is of conventional design, and includes demister pads made from metal mesh or glass fibre pads, of such fineness as the designer may require.

The collector-drain may be divided internally, in that concentrate emanating from the demister 47, via outlet 30A, joins the concentrate emanating from the collector-plates 46 at a point that lies outside the ductwork, to form the final-water-outlet 30. Discharge should be through a U-bend, or the like, to provide a liquid seal.

The demister pads should be easily replaceable as fouling can be expected in some situations. Preferably, the pressure drop across the demister should be monitored, e.g by the use of a manometer or other sensor, and with alarms if desired.

The airstream emerging from the droplet-collector 45 is saturated with gaseous or vaporous water, but contains no physical droplets of liquid water, and contains none (or almost none) of the contaminant. All (or almost all) of the contaminant has collected in the final-water-outlet 30. The water in the final-water-outlet is a solution of the contaminant, but now at a significantly greater strength of concentration than the incoming water. This final-water is now suitable to be conducted away for disposal.

Insofar as the final-water is at an elevated temperature, it can be passed through a heat exchanger (not included in the apparatus 20), to transfer its excess heat for such purposes as may be appropriate, such as heating the incoming-water, or for space-heating, etc.

The saturated airstream emerging from the droplet-collector 45 emerges from the collector-conduit portion 27 of the air-conduit 23, and passes now into the exhaust-conduit portion 28. A temperature sensor 49 measures the temperature of the airstream at this point, that temperature being designated T-post-collector degrees. In a typical case, it is arranged that this T-post-collector temperature is set at 65° C.

An airstream that is saturated at an evaporation temperature of 65° C. contains 0.21 kg of water vapour per kg of dry air. If wastewater is supplied to the apparatus at a constant flowrate, and at a constant (dilute) concentration, the concentration strength of the final-water can be kept constant if the evaporation temperature is maintained at a constant temperature. This can be done by monitoring and adjusting the supply of gas to the burner 43—increasing the gas if the evaporation temperature (the T-post-collector temperature) should fall, and reducing the gas if the evaporation temperature should rise. Controlling the temperature of the airstream controls the concentration of the final-water, because the amount of water remaining in the saturated airstream (i.e the amount of water evaporated out of the wastewater) depends on the temperature of the airstream.

The saturated airstream enters the exhaust-conduit 28 at a temperature, still, of about 65° C. The airstream now passes through the heat-exchanger 42, whereby some of this excess heat is imparted to the incoming air that is entering via the air-inlet 24. The heat-exchanger 42 is arranged such that the cold incoming ambient air encounters first the airstream that is about to be discharged, i.e the coolest portion of the airstream, and then the movement of the incoming airstream brings it into heat-transfer contact with the warmer portions of the outgoing air, until the now partially warmed incoming air encounters the hot 65° C. air as it emerges from the droplet-collector 45.

Figure 5:
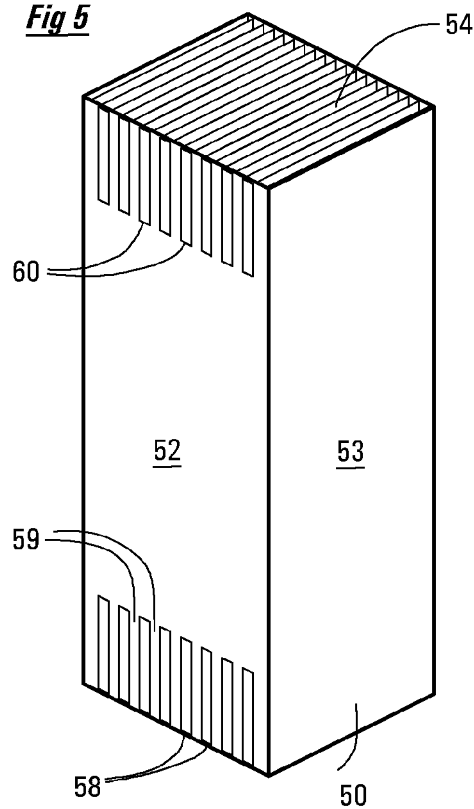
FIG. 5 is a pictorial view of a heat-exchanger that is a component of the apparatus.
Figure 6:
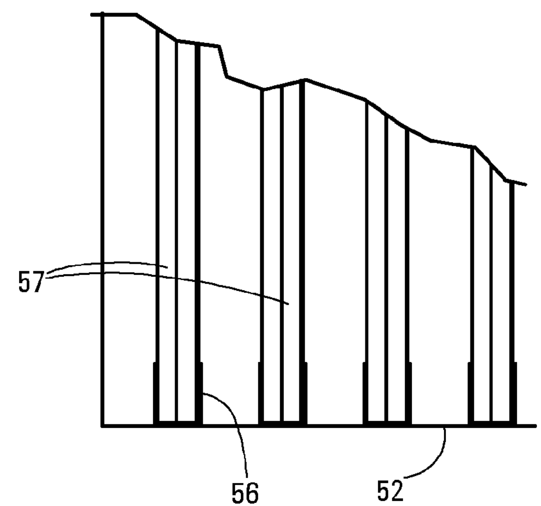
FIG. 6 is a close-up plan view, in cross-section, of a portion of the heat-exchanger.

As shown in FIG. 5, the heat exchanger 42 is of simple and efficient construction. The heat exchanger comprises an enclosed metal box 50, having front 52, rear, left, right 53, panels, a roof 54, and a floor. The front and rear panels of the box 50 carry respective series of channels 56 (FIG. 6). Partitions 57 of stainless steel engage the channels 56, the arrangement creating a series of chambers. The chambers are characterised each as deep and high, but very narrow. The chambers may be termed A-chambers and B-chambers, which are arranged in alternating intercalation across the width of the box 50.

Corrugations in the partitions 57 act to make the air passing through the chamber somewhat turbulent, mixing the air within the chamber, and maximising the heat transfer effect.

Slots 58 are provided near the foot of the front panel 52. These lower-front slots 58 are arranged to communicate only with the A-chambers. That is to say, the openings of the lower-front slots 58 lie over the A-chambers, whereas the metals 59 between the lower-front slots 58 lie over (i.e the metals cover) the B-chambers.

There is another series of slots near the foot of the back panel of the box. These lower-back slots lie over the B-chambers and the metals between them lie over the A-chambers. There are two more series of slots, which are located near the top of the box; the upper-front series of slots 60 in the front panel 52 communicate with the A-chambers, and the upper-back slots in the back panel communicate with the B-chambers. Thus, the A-chambers are open to the lower-front slots 58 and the upper-front slots 60, whereas the B-chambers are open to the lower-back slots and the upper-back slots. (Alternatively, the slots may be arranged such that the A-chambers are open to the lower-front slots 58 and the upper-back slots, whereas the B-chambers are open to the lower-back slots and the upper-front slots 60, if that would make for more convenient ducting layout.)

In FIG. 1, the A-chambers receive the incoming ambient air, through the lower-front slots 58. This new air travels up the heat-exchanger, in the A-chambers, where it is progressively warmed. The warmed air passes out through the upper-front slots 60 into the intake-conduit 63. The hot saturated air from the droplet-collector 45 enters the heat-exchanger 42 through the upper-back slots, and travels down the heat-exchanger, emerging through the lower-back slots, whence it is conveyed away via the stack air-outlet stack 25.

Liquid water condenses out of the saturated exhaust air as it cools. This liquid water trickles down the partitions 57, and collects in the bottom of the heat exchanger, whence it drains out through a condensate-drain 62. The condensate is, of course, kept separate from the strongly-concentrated contaminated final-water in the final-water-outlet 30.

The above-described arrangement of the heat-exchanger 42 is structurally strong, is easy to fabricate from standard materials, and makes highly efficient use of the heat transfer surfaces.

The final-airstream is discharged from the air-outlet 25 at a temperature of about 35° C., and the incoming air in the intake-conduit 63 is pre-heated to about 55° C. or 60° C. prior to passing the burner 43.

A fan or blower 64 drives the airstream around the conduits as indicated. The blower is located in the air-conduit 23 between the collector-conduit 27 and the exhaust-conduit 28, i.e just where the airstream emerges from the droplet-collector 45. Placed thus, the airstream receives an input of energy (from the blower fan) just as it emerges from the droplet-collector. This energy input can raise the temperature of the airstream a degree or so, which can serve to make sure that none of the moisture content condenses out of the airstream at this point. Alternatively, the designer can arrange for the blower to be placed elsewhere in the air circulation circuit.

The temperature of the water in the condensate-drain 62 is likely to be above the ambient temperature, and the designer might arrange for the excess heat to be heat-exchanged for e.g pre-heating the incoming contaminated water, or for some other useful purpose.

When specifying a new apparatus for a particular site, the designer has the following main parameters in mind:— the flow rate of the incoming wastewater (kg/sec);

the strength of the contaminant solution in the incoming wastewater (% by weight).

the desired strength of the contaminant solution in the final-water (% by weight).

the temperature (° C.) and humidity (%) of the ambient air.

As to the latter parameter, generally the designer will want to ensure that the apparatus is sized to provide an adequate evaporation rate even when the ambient air is at e.g 30° C., and is at 100% humidity. Saturated air at 30° C. contains 0.031 kg of water vapour per kg of dry air.

Preferably, the temperature at which the evaporation takes place should be sufficiently above the temperature of the ambient air that, even if the ambient air is 100% humid, the water content of the incoming air is only a small fraction of the air's capacity to hold water vapour at 65° C. For example, if the evaporation is carried out at around 65° C., saturated air at 65° C. contains 0.17 kg of water vapour per kg of air; therefore, whether the incoming ambient air at 30° C. (or less) is saturated (at 0.03 kg/kg), or not, makes little difference to the vapour-holding capacity of the air at 65° C.

Knowing the concentration of the dissolved contaminant in the incoming water, and the desired concentration of the contaminant in the final-water, the designer calculates the water evaporation rate (in kg/min of water), i.e the rate at which water needs to be evaporated from the incoming flow-rate of wastewater to arrive at the desired strong final concentration.

Knowing the desired water evaporation rate, the designers select an air flow rate, and a temperature. They can select either a high-temperature-low-flowrate, or a low-temperature-high-flowrate, regime, or some suitable compromise. For reasons to be discussed, it is preferred that the designer use a temperature of 65° C. as the temperature at which the evaporation is to take place. Knowing that air at 65° C. can hold 0.17 kg of water per kg of air, the designer can now determine the flowrate of air which, at 65° C., will hold the quantity of water vapour that is desired to be removed from the wastewater.

Having thus set the temperature of the evaporation, and having accordingly determined the required flowrate of air, the designer can now proceed to size the conduits, ducts, fan (blower), and the associated components of the apparatus. The air flowrate is very relevant in determining the cost of the apparatus, i.e the capital cost is very much determined by the air flowrate.

Upon being made operational, such apparatus is capable of being employed to evaporate water at a certain maximum rate. Usually, of course, the required evaporation rate will be below the maximum. Now, the operators must avoid taking too much water out of the wastewater flow, and in order to do so may choose either to reduce the airflow rate down from the design maximum, or to reduce the temperature down from 65° C. The operators preferably should keep the air flowrate more or less at the maximum, and should rather drop the temperature at which evaporation takes place, to cater for a reduced evaporation requirement. Industrial wastewater often does contain at least traces of volatile contaminants, and the lower the temperature of evaporation, the more likely it is that these traces will remain with the liquid water, and not be evaporated and discharged into the air.

It is noted that heated water evaporates into air until the air is saturated (at the level appropriate to the particular temperature of the air) and then no further evaporation takes place. Thus, as mentioned, the rate of evaporation of water out of the wastewater stream (in kg/min of water) can be controlled by controlling the temperature of the airstream. In turn, the temperature of the airstream can be controlled by controlling the flowrate at which fuel is fed to the burner 43. Thus, provided the airflowrate remains constant, the rate of evaporation of water can be controlled using the signal from the temperature sensor 49 to adjust the fuel feed to the burner.

Indeed, since the operators will very likely be regularly checking the concentration of contaminant in the final-water, they may arrange for the final concentration level to be available as a real-time on-going signal; if so, that signal itself can be used to control the flow of gas to the burner, the rule being: if the final-water concentration is coming through a little on the strong side, supply a little less gas; if too dilute, supply more gas (to evaporate more water).

There may be difficulties in using the concentration as the control signal, and, provided the airflowrate remains constant, and provided the concentration of contaminant in the incoming wastewater remains constant, the designer may arrange that the system is operated by controlling the gas so as to keep the signal from the temperature sensor 49 constant. This form of control will usually provide adequately accurate control of final-water concentration.

As mentioned, when the ambient air is dry, and the rate of evaporation is less than maximum, the operators should set the airflowrate to the maximum, and regulate the T-post-collector temperature to less than the preferred design level of 65° C.—down to, say, 61° C.

Alternatively, in order to keep the evaporation temperature constant (at 65° C. or some other set temperature), the operators might choose to keep the burner fuel flowrate constant, and to maintain the evaporation temperature constant by adjusting and controlling the airflowrate, e.g by controlling the speed of the blower fan.

As mentioned, the designer should size the apparatus such that the evaporation needed to achieve the desired strength of contaminant concentration in the final-water takes place preferably at a temperature of between 60° C. and 70° C., and most preferably at about 65° C. The lower limit of temperature, below which the invention could not be said to be present, would be about 55° C. The upper limit would be about 75° C. When selecting an evaporation temperature, in addition to the above considerations, the designer should have in mind also the following points.

(A) Setting the evaporation temperature (i.e the T-post-collector temperature, as measured by the temperature sensor 49) to 65° C. or 70° C., rather than to a higher temperature, is advantageous for the following additional reasons.

(i) At an evaporation temperature of 65° C., the evaporation rate is comparatively easy to control. Thus, if the temperature were to rise to, say, 70° C., then the evaporation rate of course would rise; however, the difference between the evaporation rate at 65° C. and the evaporation rate at 70° C. is comparatively small. The small change over this range means that the temperature T-post-collector does not need to be controlled very finely and accurately, in that a deviation away from 65° C. does not produce much of a change in evaporation rate. By contrast, if the evaporation temperature were to be set to, say 90° C., then the same magnitude of change in temperature, i.e to 95° C., would have a huge effect on the evaporation rate. Thus, much greater sensitivity and accuracy of control would be required, in order to maintain the evaporation temperature to 90° C. than is required in order to maintain the evaporation temperature to 65° C. The closer the temperature is to boiling-point, the more difficult it is to control evaporation rate by controlling the post-collector temperature.

(ii) At an evaporation temperature above 65° C., there are many low-grade energy sources that would be disqualified, which are available at 65° C. and below.

(iii) Raising water to more than 65° C. makes it more likely that some volatile components might escape with the air-stream as it is exhausted.

(B) Setting the evaporation temperature to 60° C. or 65° C., rather than to a lower temperature, is advantageous for the following additional reasons.

(i) When the evaporation temperature is below 65° C., now the ambient air humidity starts to have a more significant effect on operational efficiency. That is to say, when the evaporation temperature is low, the ability of the apparatus to extract water vapour becomes significantly less when the ambient air is humid, as compared with when the ambient air is dry. When the temperature is above 60° C., the level of humidity in the ambient air makes only an insignificant difference.

(ii) When the evaporation temperature is below 65° C., the airflow needed to absorb water vapour at the required rate from the wastewater increases dramatically. It is the airflow that mainly dictates the cost/size of the apparatus. At the higher temperatures, reducing the temperature a few degrees requires only a small increase in airflow to achieve the needed evaporation rate. At the lower temperatures, reducing the temperature the same small number of degrees might double the airflow requirement.

As mentioned, the air heater comprises the gas burner 43. The gas burner heats the air by direct flame, and the products of combustion enter the airstream. Insofar as any particles of soot from the flame enter the airstream, these particles may be expected to be removed in the droplet-collector. Combustion gases such as CO2, CO, are exhausted with the airstream.

If another suitable source of heat is available, which is capable of bringing the intake air up to a temperature of 100° C. or 110° C., that can be used. It is not uncommon for suitable industrial process heat to be available on-site, in which case the burner 43 can be dispensed with.

The invention claimed is:

1. Water evaporation apparatus, which includes:

a water-inlet, through which incoming-water containing a dissolved chemical at a relatively dilute concentration is conveyed to an atomizer of the apparatus;

a final-water-outlet, through which final-water containing the dissolved chemical at a relatively strong concentration is conveyed out of the apparatus;

an air-conduit, which conveys an airstream from an air-inlet to an air-outlet of the apparatus;

the atomizer is located in an atomizer-conduit portion of the air-conduit, and is effective to convert the incoming-water into fine droplets, and to inject and distribute the same into the airstream as the airstream passes over the atomizer;

an air-heater, which is located upstream of the atomizer, the air-heater being effective to heat the airstream;

a droplet-collector, which is located in a collector-conduit portion of the air-conduit, located downstream of the atomizer;

the droplet-collector is effective to mechanically remove physically-liquid droplets from the airstream, to collect the physically-liquid droplets, and to convey the resulting liquid to the final-water-outlet;

the air-conduit includes an exhaust-conduit portion, located downstream of the droplet-collector;

the exhaust-conduit is constructed and arranged for conveying air that has passed through the droplet-collector to the air-outlet;

a housing containing an atomization chamber;

an impact-plate, mounted in the atomization chamber;

a liquid-feed-port, having an open end through which liquid to be atomized emerges, and being so mounted in the housing that the emerging liquid impacts against, and rebounds from, the impact-plate;

an air-inlet-port, through which compressed air enters the housing, the port being arranged so that air enters the chamber off-centre or tangentially, whereby the entering air swirls around the chamber with a rotary motion;

the housing contains an outlet-port, through which the liquid, having impacted the impact-plate, and the compressed air emerge from the chamber;

the arrangement of the impact-plate, the tube, the chamber, the compressed air, and the liquid, are such that the motion of the liquid in the chamber can be characterised as extremely vigorous and violent, whereby the liquid is broken up into tiny droplets.

2. Apparatus of claim 1, which includes:

a distributor, having an open conical spiral form, which defines an axis;

the distributor is so arranged in relation to the outlet port as to receive the droplets of liquid axially into the centre of the conical spiral form, and to distribute the droplets radially outwards from the distributor.

3. Water evaporation apparatus, which includes:

a water-inlet, through which incoming-water containing a dissolved chemical at a relatively dilute concentration is conveyed to an atomizer of the apparatus;

a final-water-outlet, through which final-water containing the dissolved chemical at a relatively strong concentration is conveyed out of the apparatus;

an air-conduit, which conveys an airstream from an air-inlet to an air-outlet of the apparatus;

the atomizer is located in an atomizer-conduit portion of the air-conduit, and is effective to convert the incoming-water into fine droplets, and to inject and distribute the same into the airstream as the airstream passes over the atomizer;

an air-heater, which is located upstream of the atomizer, the air-heater being effective to heat the airstream;

a droplet-collector, which is located in a collector-conduit portion of the air-conduit, located downstream of the atomizer;

the droplet-collector is effective to mechanically remove physically-liquid droplets from the airstream, to collect the physically-liquid droplets, and to convey the resulting liquid to the final-water-outlet;

the air-conduit includes an exhaust-conduit portion, located downstream of the droplet-collector;

the exhaust-conduit is constructed and arranged for conveying air that has passed through the droplet-collector to the air-outlet;

a heat-exchanger, which is configured for transferring heat from the airstream in the exhaust conduit to the incoming airstream upstream of the atomizer;

the heat-exchanger includes an enclosed metal box, having left, right, front, rear, panels, a roof and a floor;

the heat-exchanger includes a series of partitions, extending between the front and back panels, and from the floor to the roof;

the panels define respective chambers therebetween, the chambers being characterised as to their shape as being deep, tall, and comparatively very narrow;

the chambers between the partitions are designated A-chambers and B-chambers, arranged in alternating intercalation across the width of the box;

the heat-exchanger includes an exhaust-inlet-port for admitting exhaust air from the droplet-collector into an upper zone of the box, and includes an exhaust-outlet-port for conveying the exhaust air out of a lower zone of the box;

the heat-exchanger includes an intake-inlet-port for admitting intake air into a lower zone of the box, and includes an intake-outlet-port for conveying the intake air out of an upper zone of the box and into the air conduit upstream of the air-heater;

the exhaust-inlet-port and the exhaust-outlet-port are arranged to communicate only with the A-chambers;

the intake-inlet-port and the intake-outlet-port are arranged to communicate only with the B-chambers.

4. Apparatus of claim 3, wherein the heat-exchanger includes a condensate collector, which is arranged to collect water condensing from the exhaust air in the A-chambers, and includes a condensate port for conveying the condensed water out of the heat-exchanger.

* * * * *